(12) United States Patent  (10) Patent No.: US 8,014,835 B2
Mizuta et al.  (45) Date of Patent: Sep. 6, 2011

(54) PORTABLE TELEPHONE SET

(75) Inventors: Masatomo Mizuta, Tokyo (JP); Kiyoshi Kohayakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 2410 days.

(21) Appl. No.: 10/424,941

(22) Filed: Apr. 29, 2003

(65) Prior Publication Data

US 2003/0211874 A1 Nov. 13, 2003

(30) Foreign Application Priority Data

May 7, 2002 (JP) ................................. 2002-131617

(51) Int. Cl.
 *H04M 1/00* (2006.01)
(52) U.S. Cl. .............. 455/575.1; 455/575.4; 379/433.07
(58) Field of Classification Search ............. 379/433.12, 379/433.07; 455/575.1, 575.4, 550.1
 See application file for complete search history.

(56) References Cited

U.S. PATENT DOCUMENTS

| 5,664,667 A * | 9/1997 | Kenmochi | 200/314 |
| 6,249,672 B1 * | 6/2001 | Castiel | 455/575.4 |
| 6,400,967 B1 * | 6/2002 | Nilsson | 455/563 |
| 6,728,558 B1 * | 4/2004 | Kubo et al. | 455/575.4 |
| 6,907,262 B1 * | 6/2005 | Heaysman | 455/550.1 |
| 2002/0137476 A1 * | 9/2002 | Shin | 455/90 |
| 2003/0064688 A1 | 4/2003 | Mizuta et al. | |

FOREIGN PATENT DOCUMENTS

| CN | 1291060 A | 4/2001 |
| CN | 1346225 A | 4/2002 |
| GB | 2235606 | 3/1991 |
| GB | 2235850 | 3/1991 |
| GB | 2319667 | 5/1998 |
| GB | 2356760 | 5/2001 |
| GB | 2376616 | 12/2002 |
| JP | 6-30086 | 2/1994 |
| JP | 6-318897 | 11/1994 |
| JP | 10-271192 | 10/1998 |
| JP | 11-220524 | 8/1999 |
| JP | 11-317583 | 11/1999 |
| JP | 2001-119467 | 4/2001 |
| JP | 2001-245035 | 9/2001 |

* cited by examiner

*Primary Examiner* — Yuwen Pan
(74) *Attorney, Agent, or Firm* — Young & Thompson (57) ABSTRACT

A portable telephone set of slide type comprises a main casing, a movable casing, the two casing being slidably coupled and capable of being locked to each other, and a lock releasing element for releasing the lock. The portable telephone set further comprises an illuminating element for illuminating the lock releasing element from the inner side.

16 Claims, 12 Drawing Sheets

PORTABLE TELEPHONE SET

BACKGROUND OF THE INVENTION

This application claims benefit of Japanese Patent Application No. 2002-131617 filed on May 7, 2002, the contents of which are incorporated by the reference.

The present invention relates to portable telephone sets and, more particularly, to portable telephone sets for improving the user's operability and convenience.

Heretofore, to meet the demand for size reduction of the portable telephone set, a foldable type, the body of which is constituted by two units foldably coupled together by a coupling member, and a slide type, are used as well as a straight type which is constituted by a single body. The slide type portable telephone set usually comprises a main casing (i.e., first unit) and a movable casing (i.e., second unit) with some function parts mounted thereon, the two casings being slidably coupled together such that the movable casing is slidable in the long axis directions relative to the main casing. At the time of voice communication or the like, the portable telephone set can be used by slidably extending the two units away from each other in the long axis directions.

The above prior art portable telephone set has the following problem. The portable telephone set adopting the above slide type structure, which is usually constituted by the main casing and the movable casing with some function parts mounted thereon and coupled to the main casing such as to be slidable relative to the same in the long axis directions, is carried in a retreated state with the two units overlapped over each other. At the voice communication time, the portable telephone set is used with the two units slidably extended away from each other in the long axis directions by operating a lock release operator (i.e., one-touch slide button).

With the portable telephone set of the above structure, however, the position of the lock release operator (i.e., one-touch slide button) can not be recognized in a dark environment. Therefore, in such circumstance the button position can not be instantly specified, and subsequent smooth operation can not be smoothly obtained.

SUMMARY OF THE INVENTION

An object of the present invention, therefore, is to provide a portable telephone set of slide type with a main and a movable casing slidably coupled and locked to each other, which can improve user's operability and convenience with respect to a lock releasing operation of releasing the lock of the main and movable casings to each other.

According to an aspect of the present invention, there is provided a portable telephone set of slide type comprising a main casing, a movable casing, the two casing being slidably coupled and capable of being locked to each other, and a lock releasing means for releasing the lock, wherein: the portable telephone set further comprises an illuminating means for illuminating the lock releasing means from the inner side.

The neighborhood of a part with the lock releasing means is disposed is made of a light-transmitting material. The main and movable casings are biased by a biasing means such that they are normally held pulled away from each other in long axis directions, and the portable telephone set further comprises a locking means for locking the two casings to each other in a retreated state, in which the two units are in an overlapped state, against the force of the biasing means.

According to another aspect of the present invention, there is provided a portable telephone set comprising a main casing, a movable casing, a slidably locking means for slidably locking the main and movable casings to each other, a lock release operator disposed on one side of the main or movable casing and operable for releasing the state of lock of the main and movable casings brought about by the slidable locking means, and an illuminating means for illuminating the lock releasing means from the inner side, wherein: the neighborhood of a part, in which the lock release operator of the main or movable casing is disposed, is at least partly made of a light-transmitting material, the illuminating part being "on"/"off" controlled at a call arrival call time or a main reception time.

According to other aspect of the present invention, there is provided a portable telephone set comprising a main casing, a movable casing, a slidably locking means for slidably locking the main and movable casings to each other, a lock release operator disposed on one side of the main or movable casing and operable for releasing the state of lock of the main and movable casings brought about by the slidable locking means, and an illuminating means for illuminating the lock releasing means from the inner side, wherein: the neighborhood of a part, in which the lock release operator of the main or movable casing is disposed, is at least partly made of a light-transmitting material, the illuminating part being "on"/"off" controlled at the time of operation of the lock release operator in dependence on whether the lock release operator is operable.

Other objects and features will be clarified from the following description with reference to attached drawings.

BRIEF DESCRIPTION OF THE DRAWINGS

FIG. 1 shows

PREFERRED EMBODIMENTS OF THE INVENTION

Preferred embodiments of the present invention will now be described with reference to the drawings.

FIGS. 1(a), 1(b) and 2(a) to 2(c) show an embodiment of the portable telephone set according to the present invention. In view of the shape, the portable telephone set 400 shown in these Figures comprises two units, namely a front unit 100 with a display, etc. provided thereon and a back unit 200 with main operating parts provided therein, the two units being slidably coupled together by a slide mechanism such that they can slide in long axis directions relative to each other.

Figure 1:
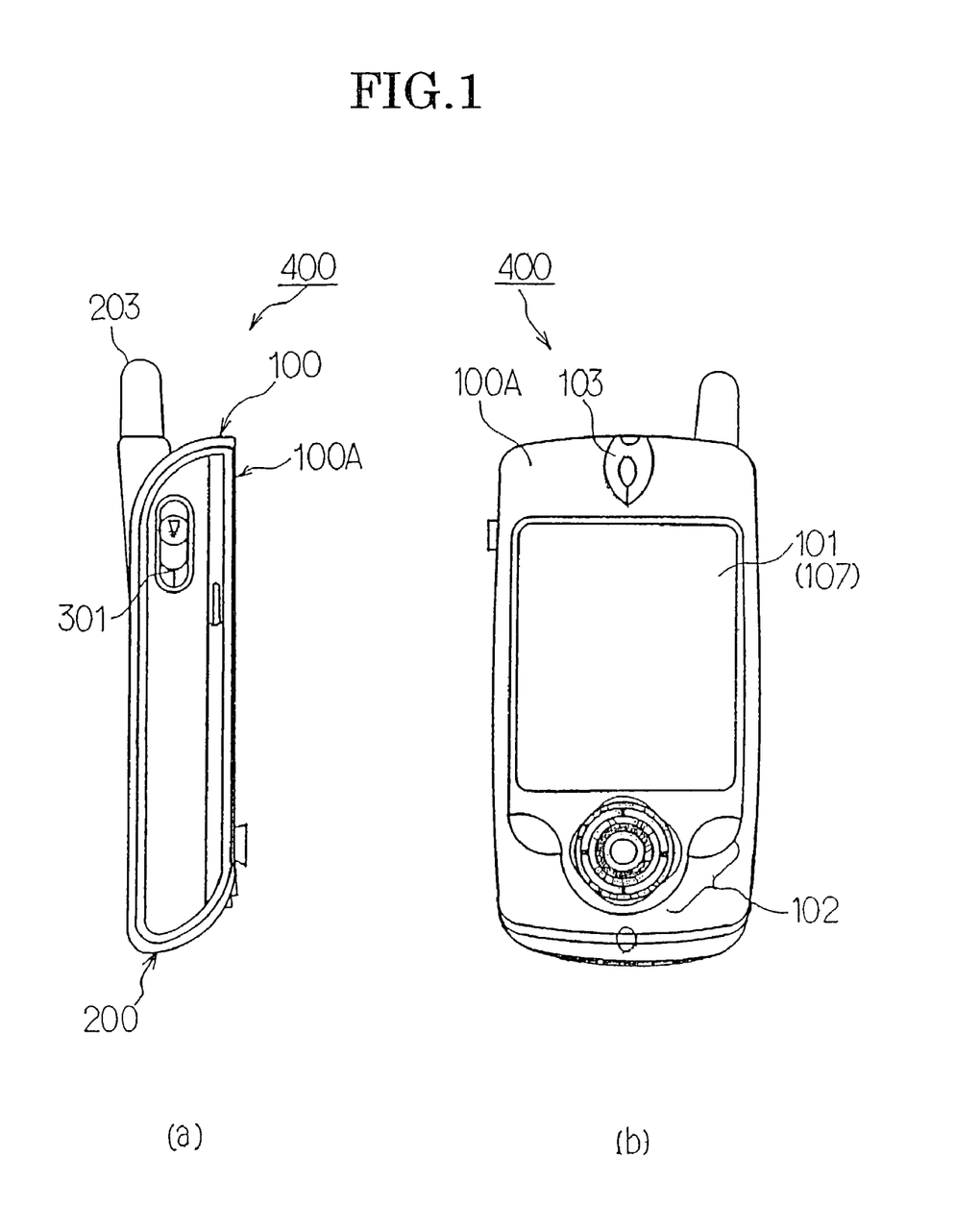
FIGS. 1(a) and 1(b) are a side view and a front view, respectively, showing a portable telephone set according to the present invention in a retreated (or accommodated) state with a front unit and a back unit overlapped over each other.
Figure 2:
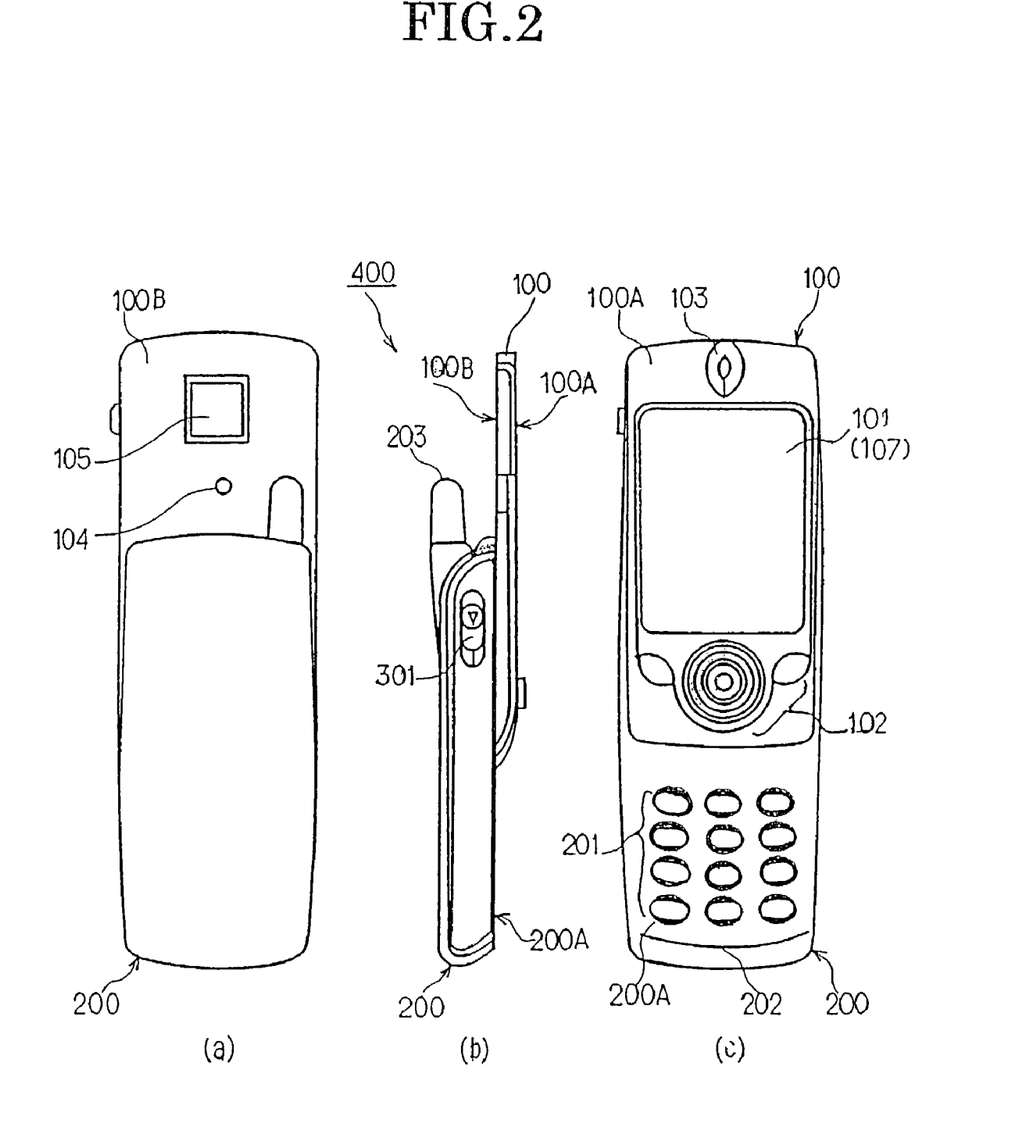
FIGS. 2(a) to 2(c) are a back view, a side view and a front view, respectively, showing the portable telephone set according to the present invention in an extended state (or state of use) with the front unit having been caused to slide upward along the long-axis over the back unit.
Figure 3:
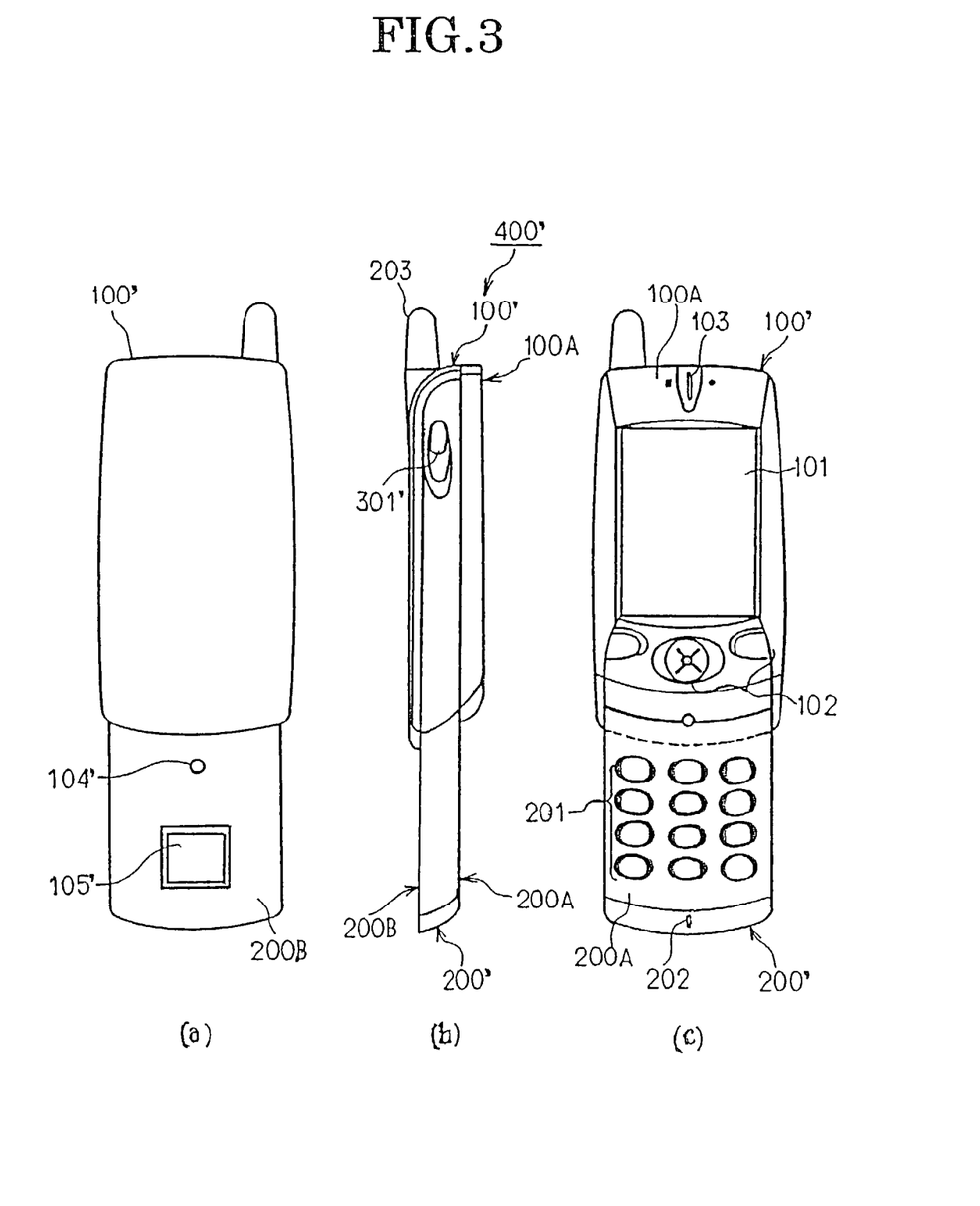
FIGS. 3(a) to 3(c) show an example of slide mechanism, in an extended state thereof, which can be used in the embodiment of the present invention.
Figure 4:
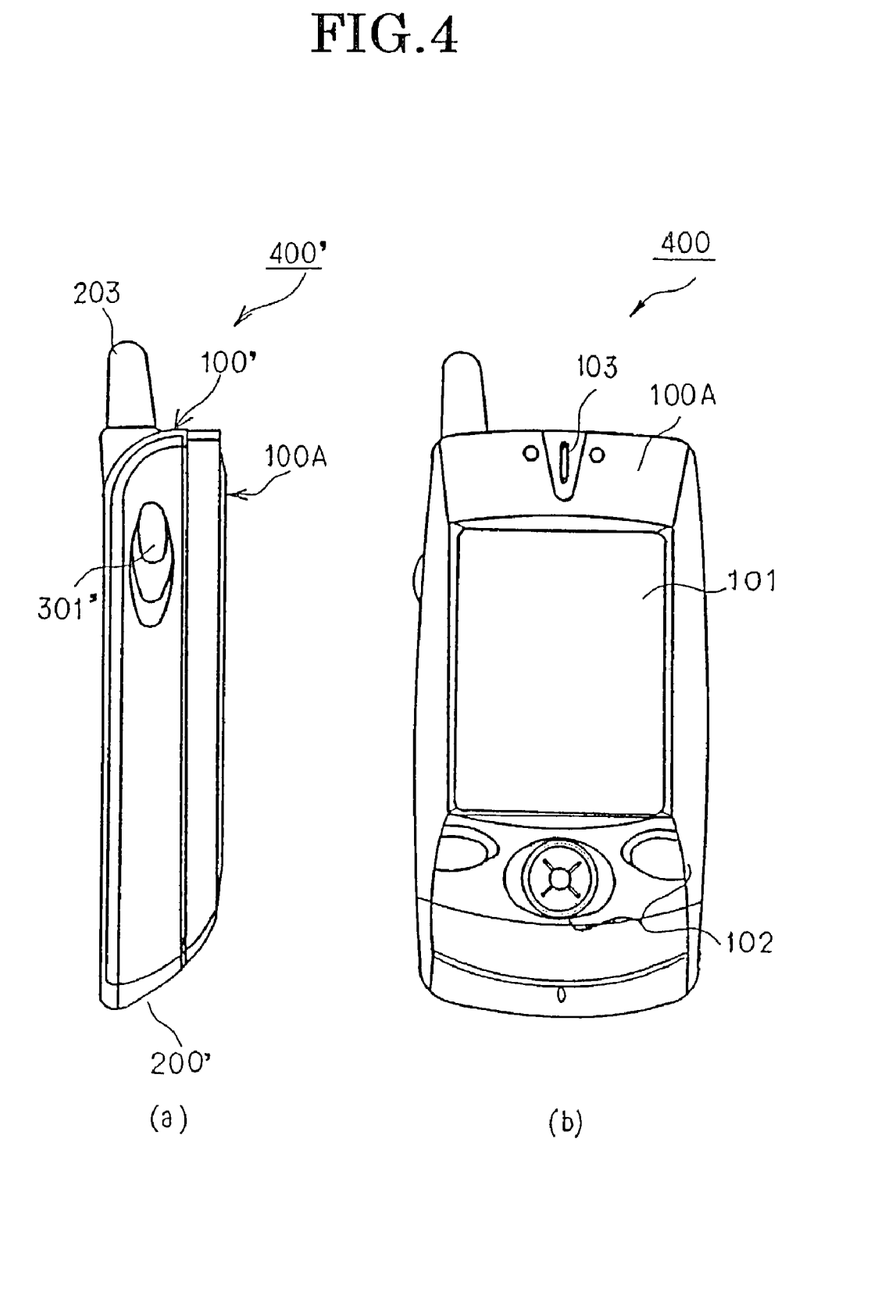
FIGS. 4(a) and 4(b) are views showing the slide mechanism, in a retreated state thereof, of the embodiment of the present invention as shown in FIGS. 3(a) to 3(c)
Figure 5:
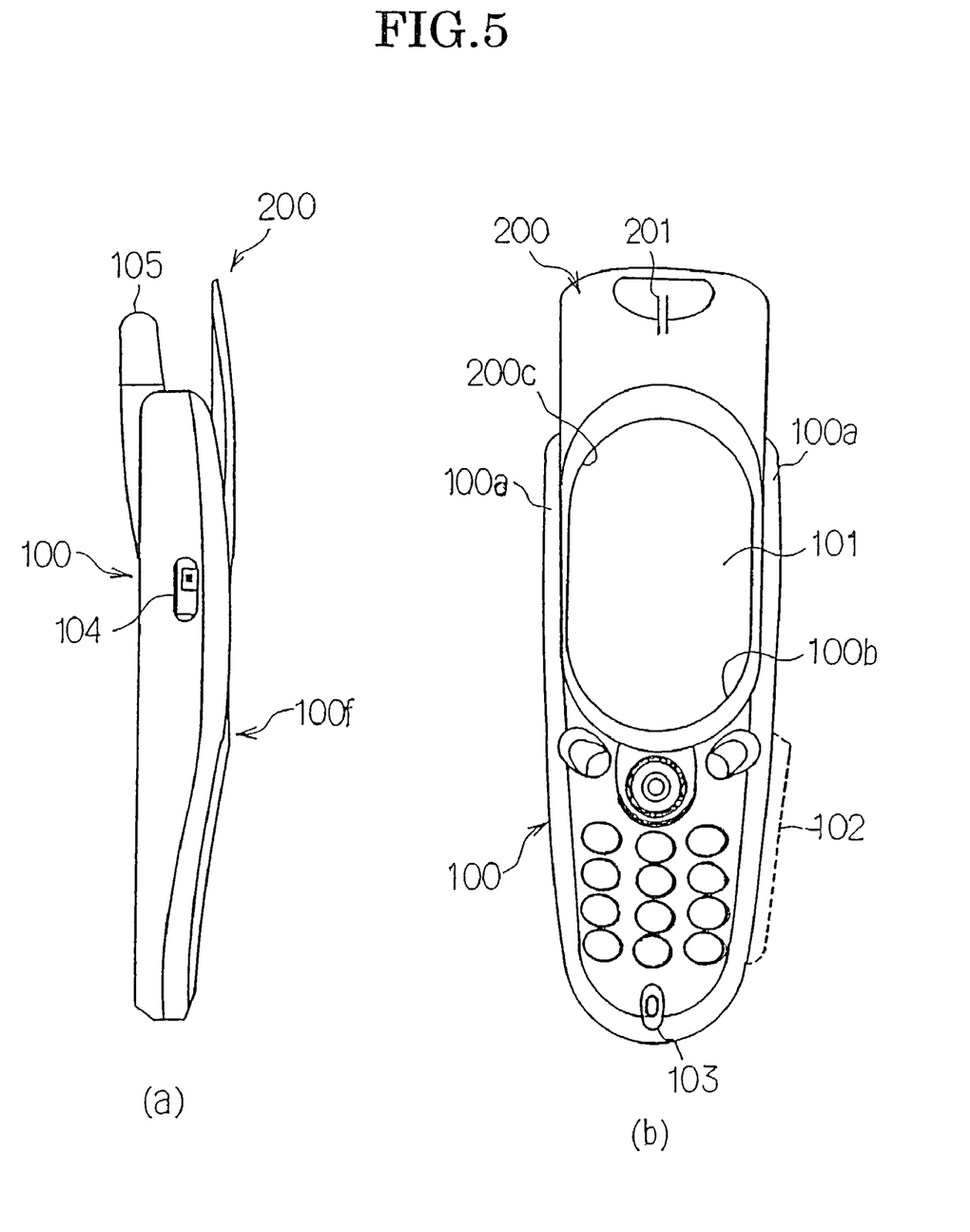
FIGS. 5(a) to 5(c) show an example of slide mechanism, in an extended state thereof, which can be used in the embodiment of the present invention.
Figure 6:
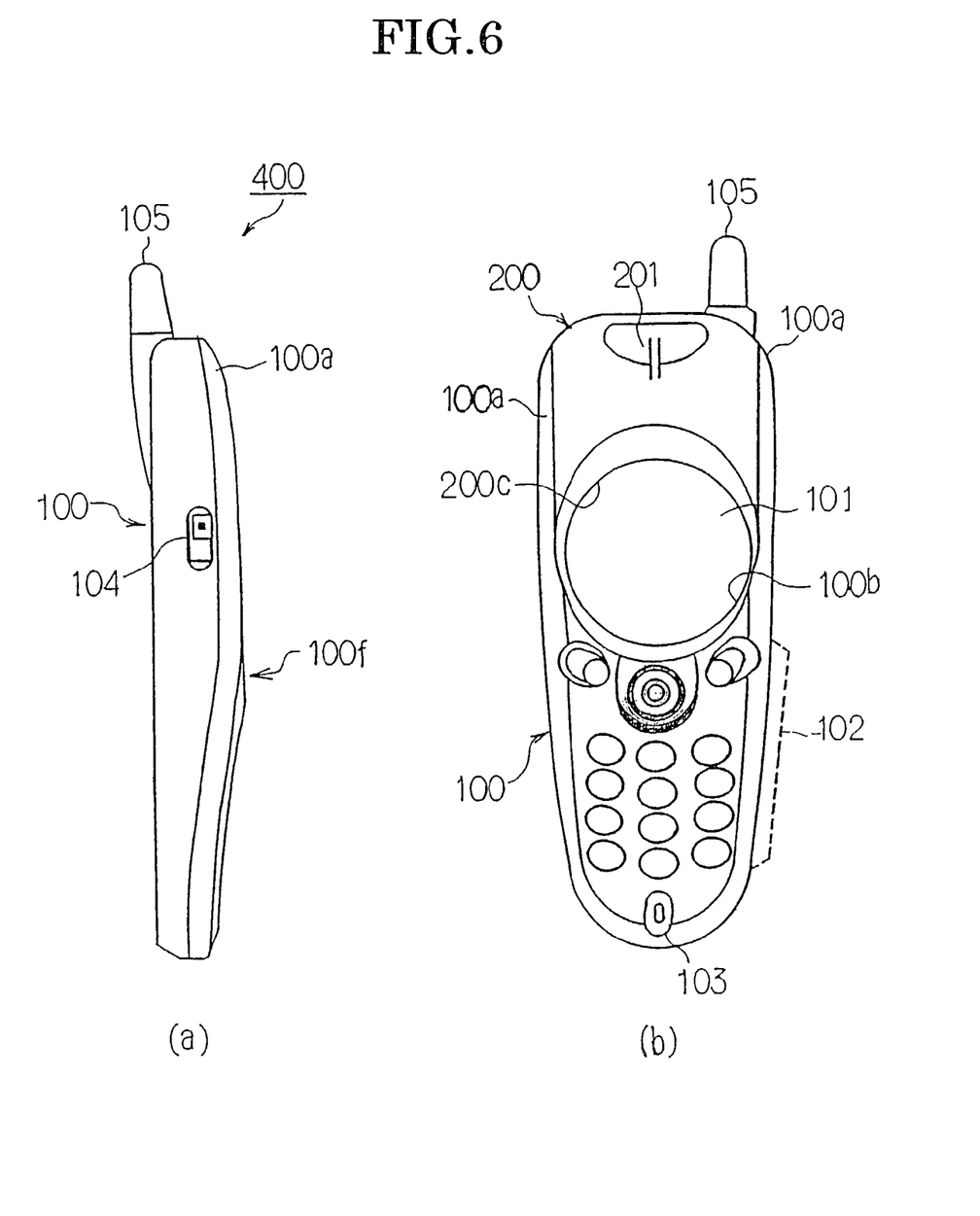
FIGS. 6(a) and 6(b) are views showing the slide mechanism, in a retreated state thereof, of the embodiment of the present invention as shown in FIGS. 5(a) to 5(c)
Figure 7:
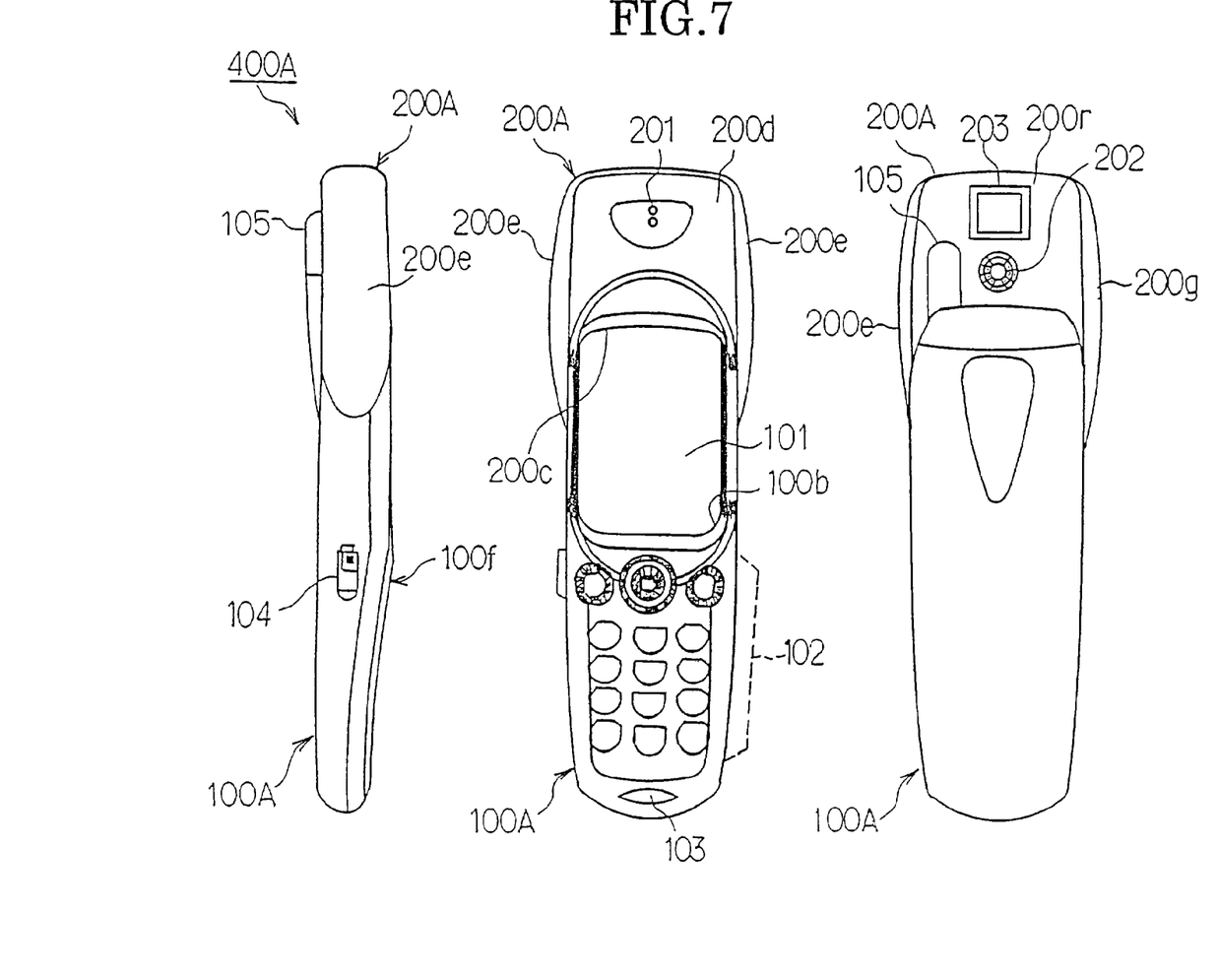
FIGS. 7(a) to 7(c) show an example of slide mechanism, in an extended state thereof, which can be used in the embodiment of the present invention.
Figure 8:
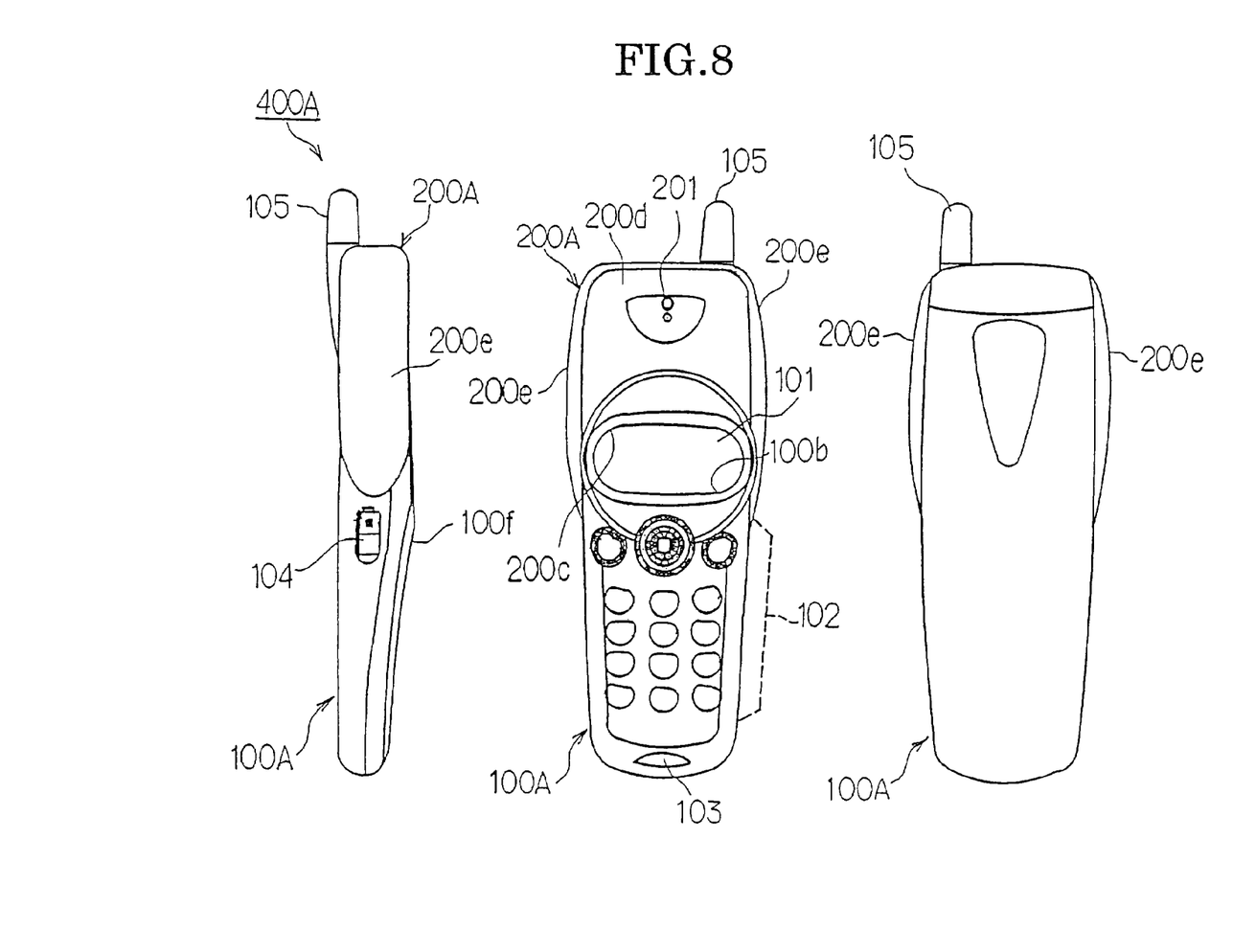
FIGS. 8(a) and 8(b) are views showing the slide mechanism, in a retreated state thereof, of the embodiment of the present invention as shown in FIGS. 7(a) to 7(c)
Figure 9:
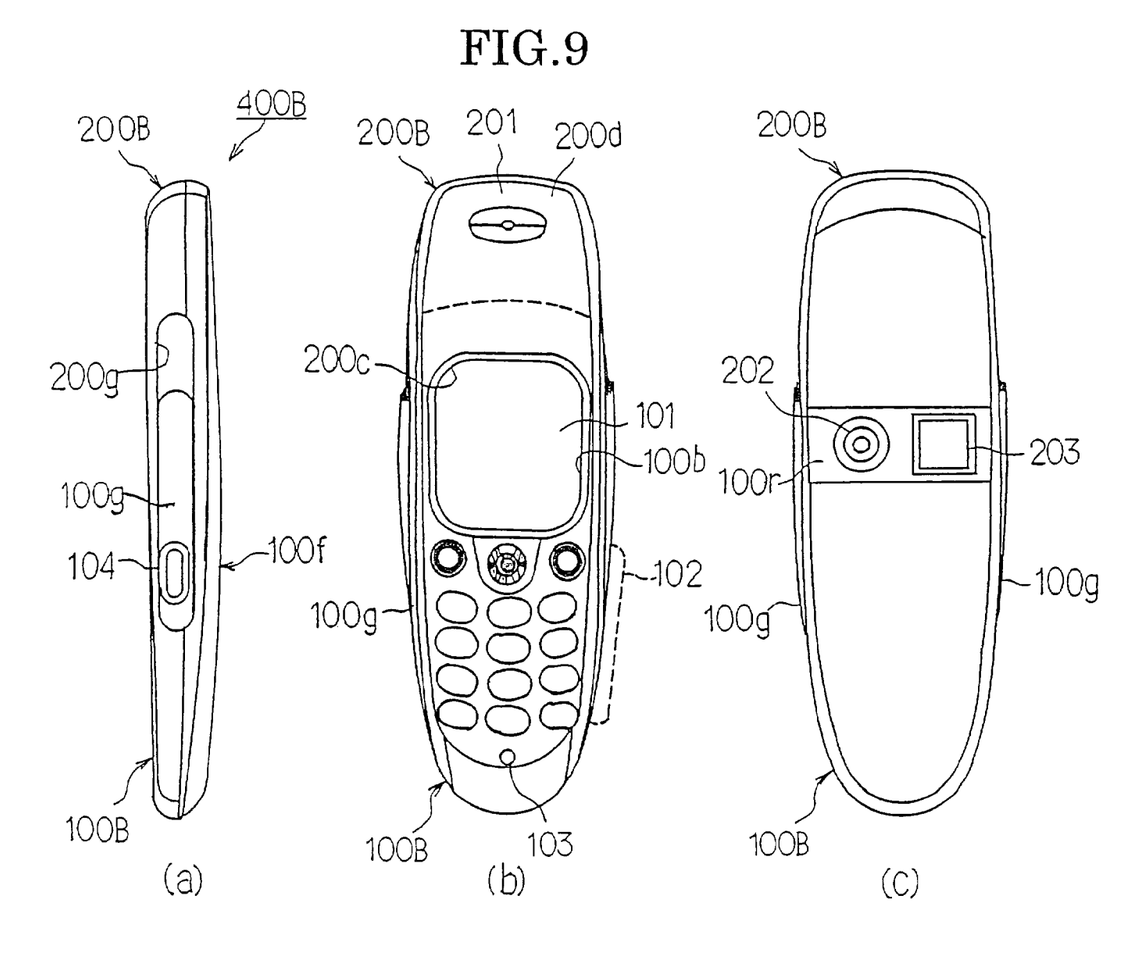
FIGS. 9(a) to 9(c) show an example of slide mechanism, in an extended state thereof, which can be used in the embodiment of the present invention.
Figure 10:
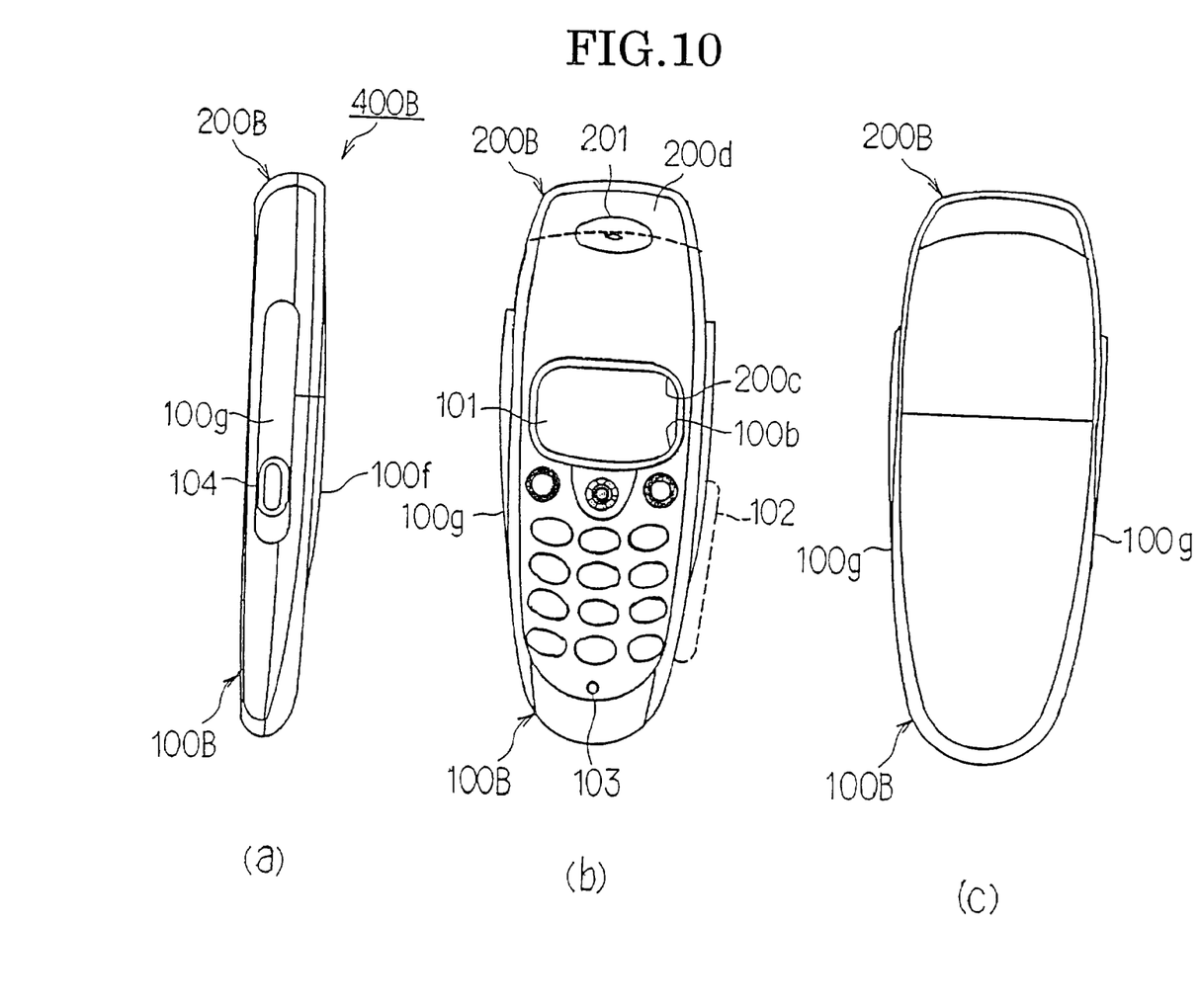
FIGS. 10(a) and 10(b) are views showing the slide mechanism, in a retreated state thereof, of the embodiment of the present invention as shown in FIGS. 9(a) to 9(c)

FIG. 1(a) is a side view showing the portable telephone set 400 in a contracted state (i.e., accommodated state) with the front and back units 100 and 200 overlapped over each other. FIG. 1(b) is a front view showing the same portable telephone unit 400. FIGS. 2(a) to 2(c) are a back view, a side view and a front view, respectively, showing the portable telephone set 400 in an extended state (i.e., state of use) with the front unit 100 slidably moved upward relative to the back unit 200.

The front unit (i.e., first unit) 100 is substantially rectangular in planar shape and has a predetermined thickness. The front unit 400 has, on its front surface (hereinafter referred to as first main surface 100A), a large size display (i.e., LCD display) 101, an auxiliary operating part 102 and a receiver (or loudspeaker) 103, and also has, on its back surface (hereinafter referred to as first auxiliary surface 100B), an electronic imaging unit 104 (i.e., CCD camera) and an optical aperture (i.e., sensor part) of a fingerprint certifier part 105 as optical function parts. A magnet 106 is disposed on the first auxiliary surface 100B at a suitable position thereof. A touch panel mechanism 107 may be assembled in the display 101.

The back unit (i.e., second unit) 200 has substantially the same rectangular planar shape as the front unit 100, and is slidably provided on the back side thereof. The back unit 200 has, on a lower part of its front surface (hereinafter referred to as second main surface 200A), a main operating part 201 and a transmitter (i.e., microphone) 202, and also has, on one side of it, a lock release operator (i.e., one-touch slide button) 301. The back unit 200 accommodates in its inside other electric circuits to be described later.

The neighborhood of parts, in which lock release operators (i.e., one-touch slide buttons) 301 of the front and back units 100 and 200 are disposed, is constituted by a light-transmitting material such as transparent or opaque resin or silicone rubber.

The two units are biased by a biasing means provided in the inside of the portable telephone set such that they are normally pulled apart or extended in the long axis directions (i.e., in the state as shown in FIGS. 2(a) to 2(c)). A locking means (or lock mechanism) is provided to lock the two units to each other in the overlapped (i.e., retreated) state of the units against the force of the biasing means. This lock is released by operating the lock release operator 301 provided on one side of the back unit.

In this operation, when slide operation of the lock release operator 301 is made, the mechanism of the lock of the front and back units 100 and 200 in the retreated state (i.e., accommodated state) is released, and the front and back units 100 and 200 are caused by the biasing means to be brought to the open state of use with automatic sliding of the front unit 100 over the back unit 200. An alternative arrangement that the lock mechanism is released by pushing down the lock release operator 301 may also be readily made.

In this embodiment of the portable telephone set, in order to check whether the two units are in the retreated or extended state, a magnet 106 is provided on the front unit 100 at an appropriate position thereof. The back unit 200, on the other hand, has a magnetic sensor 210 of a hole element or the like, which is disposed at a position corresponding to the magnet 106 in the retreated state of the units, for instance. The retreated state can be detected, because in this state a predetermined output is obtainable from the magnetic sensor 210 owing to the magnetic field of the magnet 106.

As described above, in this embodiment of the portable telephone set, with one-touch operation of causing sliding of the lock release operator 301 on the back unit when the portable telephone set is in the retreated state (see FIGS. 1(a) and 1(b), in which the back unit (i.e., second unit) with the main operating part is overlapped under the back surface of and locked to the front unit (i.e., first unit) with the display and the receiver, the front unit with the display is caused to slide upward over the back unit to bring about the extended state (see FIGS. 2(a) to 2(c). In this state, the main operating part is exposed, and the microphone and the receiver are found to be at appropriate positions, and various operations and voice communication can be made.

The slide mechanism described above is by no means limitative, and obviously it is possible to adopt various other slide mechanism as well. FIGS. 3(a) to 3(c) to 10(a) to 10(c) show different examples of the slide mechanism, in which the two units are coupled to each other slidably in the long axis directions. FIGS. 3(a) to 3(c) and FIGS. 4(a) to 4(c), FIGS. 5(a) to 5(c) and FIGS. 6(a) to 6(c), FIGS. 7(a) to 7(c) and FIGS. 8(a) to 8(c), and FIGS. 9(a) to 9(c) and FIGS. 10(a) to 10(c), are back, side and front views showing the sets in the extended and retreated states, respectively. In these Figures, reference numerals are like those shown in FIGS. 1(a) and 1(c) and 2 (a) to 2(c), and numerals with affixed large and small alphabet letters are alike in function and constitution.

Figure 11:
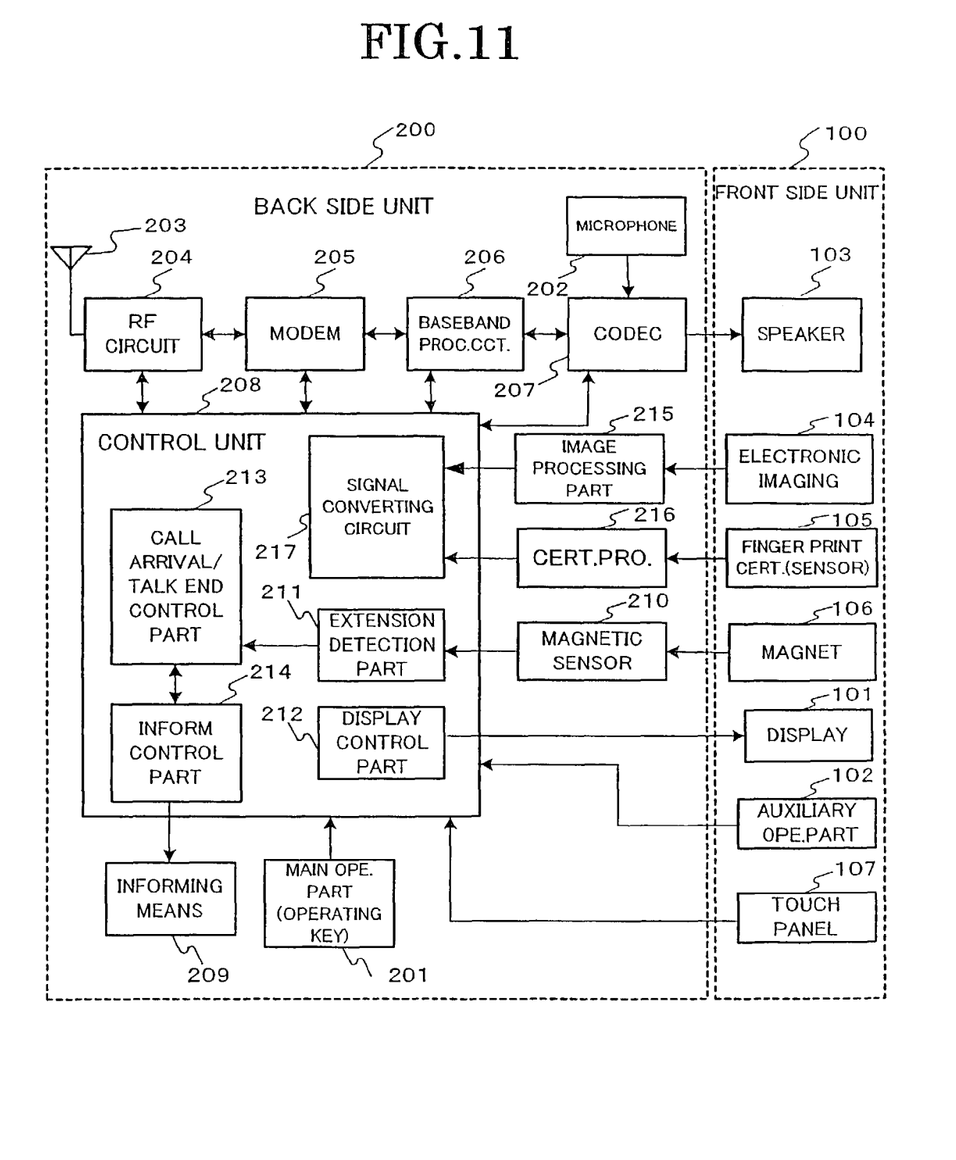
FIGS. 11 and 12 show block diagrams of the portable telephone set according to the present invention.

Electronic circuit parts or the like in this embodiment will be described. FIG. 11 is a block diagram showing electric circuit parts in the embodiment of the portable telephone set. As shown in FIG. 11, this embodiment of the portable telephone set comprises a display (i.e., liquid crystal display LCD) 101, an auxiliary operating part (i.e., auxiliary operating keys) 102, a receiver (i.e., loudspeaker) 103, an electronic imaging unit (i.e., CCD camera) 104, a fingerprint certifier 105, a magnet 106 for detecting the relative positions, i.e., extended state of the front and back units, and a touch-panel mechanism 107 assembled on the surface of the display 101, these function parts being mounted on the front unit 100.

This embodiment of the portable telephone set further comprises an antenna 203, an RF circuit 204, a modulating/demodulating (modem) circuit 205, a baseband processing circuit 206, a codec circuit 207, a control part 208, a microphone 202, a main operating part (operating keys) 201, an informing means 209, an image processing part 215, and a magnetic sensor (i.e., hole element) 210 corresponding to the magnet 106.

The control part 208 includes an extension detection part 211 for checking, based on the unit of the magnetic sensor 210, whether the two units are in the retreated or extended state, a display control part 212 for controlling the display, a call arrival/talk end control part 213 capable of call arrival control operation in correspondence to the retreated and extended states of the two units, an informing control part 214 capable of control call arrival time informing operation in correspondence to the contracted and extended states of the two units, and a signal converting circuit 217 for converting signals from an image processing part 215 and a certification processing part 216.

The RF circuit 204 has a receiving circuit, a transmitting circuit and a frequency synthesizer (the elements being not shown). The main operating part 201 has such operating keys as well-known transmit key, English letter/kana/Chinese character/numeral figure conversion key, power supply on-off key, a cursor operating cross key and an end key. These various function parts are mounted in or on the surface of the back unit 200. The individual parts constituting the electric circuit part of the embodiment as shown in FIG. 11 may be those well known in the art, and their detailed description is not given.

In the embodiment of the portable telephone set, the front unit 100 has an auxiliary operating part 102 provided on the first main surface 100A, and permits such operations as mail operation, image operation and call arrival operation relevant to displayed contents on the display with the front and back units in the overlapped state by watching the displayed contents.

Figure 12:
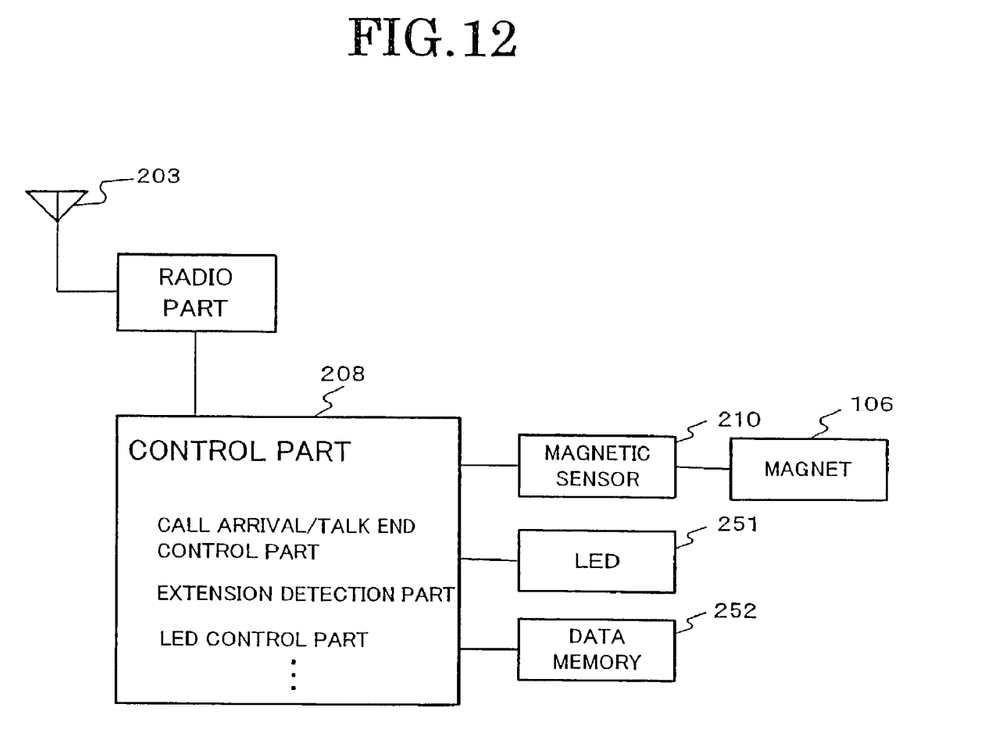

Referring to the block diagram of FIG. 12, an LED 251 and a data memory part 252 are shown. The LED 251 is an example of a light-emitting element for illuminating, from the inner side, the neighborhood of parts, in which the lock release operators (i.e., one-touch slide buttons) 301 of the front and back units 100 and 200 are disposed. The data memory part 252 stores such data as telephone diary data, setting data of various input operating functions of lock release operators (i.e., one-touch release buttons) 301, and LED "on"/"off" control data corresponding to the relative positions of the front and back unit 100 and 200 to each other.

The operation of the embodiment of the portable telephone set will now be outlined. The voice communication functions and data transmitting and receiving functions of the embodiment of the portable telephone set may be like those in the prior art, and their description as a whole is not given or given briefly. Mainly, operations which are deeply related to the present invention will now be described.

When the receiving circuit detects a signal informing a call arrival at the own set in a call waiting time, it informs the call arrival to the control part 208. When the control part 208 receives, from the receiving circuit, the information of a call arrival at the own set, it informs the call arrival at the own set to the user by driving the informing means 209 such as a call bell or a vibrator.

At this time, the LED 251 for illuminating, from the inner side, the neighborhood of a part, in which the lock release operators (i.e., one-touch slide buttons) 301 of the front and back units 100 and 200, is "on"/"off" controlled. That is, at the call arrival call time, the LED 251 is turned on to cause light emission from the lock release operators (i.e., one-touch slide buttons). Also, control data such as light emission, light intensity, color and pattern (i.e., "on" time, "on"/"off" intervals and "on" color changes) corresponding to the transmitter's number with the call received therefrom, are stored in the data memory part 252 for "on"/"off" control.

The magnet 106 and the magnet sensor 210 are provided for detection as to whether the two units are in the retreated or extended state or the extended position in case of such an arrangement that the extended state can be detected stepwise. "On"/"off" control data concerning the LED 251 corresponding to the result of detection is preliminarily stored in the data memory part 252 for the control of the light emission, light intensity, color and pattern (i.e., "on" time, "on"/"off" intervals and "on" color changes) of the LED 251. For example, where the two units are provided with a plurality of localities of light emission (i.e., illumination) at the call arrival time, by arranging such that the light intensity of the LED 251 is maximum in the retreated state, in which the back unit 200 is concealed and the visible light emission (i.e., illuminated) localities are minimum in number, it is possible to provide for improved convenience of the user and also save the battery by reducing the light intensity of the LED 251 according to the quantity of visible light emission (or illuminated) localities.

As a function provided when the lock release operator (i.e., one-touch slide button) 301 is operated for the first time at a call arrival time, it is possible to preset, as desired, off-hook, call arrival tone stop, call arrival tone level reduction, sliding of the two units, response retention, etc. for each of the cases that the two units are in the retreated and extended state, thus permitting control of the light emission, light intensity, color and pattern (i.e., "on" time, "on"/"off" intervals and "on" color changes) of the LED 251 according to the preset contents.

Alternatively, in the case where a mechanism for disabling the operation of the lock release operator (i.e., one-touch slide button) 301 to bring the two units in the retreated state to the extended state (i.e., bringing about a slide lock state), the LED 251 is "on"/"off" controlled according to whether the lock release operator (i.e., one-touch slide button) 301 is operable or not. So long as the setting is such that sliding or the like can not be caused by operating the lock release operator (i.e., one-tough slide button) 301, it is no longer necessary to cause light emission from the LED 251. Furthermore, it may be made to let the locked state be informed to the user with light emission in a predetermined color.

The LED light emission at the call arrival time may be provided not only at the time of a voice communication call arrival but also at the time of a mail call arrival.

As has been described in the foregoing, with the portable telephone set according to the present invention, the following pronounced advantages are obtainable. The portable telephone set according to the present invention adopts the slide type structure, and the lock release operators are illuminated from the inner side when causing the sliding of the units. Thus, the visual recognition property is improved by the illumination, and the button position can be instantly specified even in a dark environment, and the subsequent operation can be performed smoothly. Also, the light emission, light intensity, color and pattern (i.e., "on" time, "on"/"off" interval and "on" color changes) of the LED 252 are controlled based on transmitter's data, retreated/extended state, function provided by the operation of the lock release operators (i.e., one-touch slide buttons) and whether the lock release operator is operable, and it is thus possible to improve the user's convenience and operability.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable telephone set of slide type comprising a main casing, a movable casing, the two casings being slidably coupled and capable of being locked to each other, and a lock releasing means for releasing the lock, wherein:

the portable telephone set further comprises an illuminating means for illuminating the lock releasing means from the inner side, and further comprises a detecting means for detecting the advanced position of the main casing and the movable casing, a condition of the illuminating means being controlled according to whether the main casing and the movable casing have been retreated or advanced.

2. The portable telephone set according to claim 1, wherein the neighborhood of a part with the lock releasing means is disposed is made of a light-transmitting material.

3. The portable telephone set according to claim 1, wherein the main and movable casings are biased by a biasing means such that they are normally held pulled away from each other in long axis directions, and the portable telephone set further comprises a locking means for locking the two casings to each other in a retreated state, in which the two units are in an overlapped state, against the force of the biasing means.

4. The portable telephone set according to claim 1, which further comprises a data storing part for storing "on" control data of the illuminating means corresponding to a transmitter, a condition of the illuminating part being controlled with reference to said transmitter's data.

5. The portable telephone set according to claim 1, wherein the "on" pattern of the illuminating means is "on" time, "on"/"off" interval and "on" color change.

6. A portable telephone set comprising:
a main casing,
a movable casing,
a slidable locking means for slidably locking the main and movable casings to each other,
a lock release operator disposed on one side of the main or movable casing and operable for releasing the state of lock of the main and movable casings brought about by the slidable locking means, and
an illuminating means for illuminating the lock releasing means from the inner side, wherein,
the neighborhood of a part, in which the lock release operator of the main or movable casing is disposed, is at least partly made of a light-transmitting material, the illuminating means being "on"/"off" controlled at a call arrival call time or a main reception time and
further comprises a detecting means for detecting the advanced position of the main casing and the movable casing, a condition of the illuminating means being controlled according to whether the main casing and the movable casing have been retreated or advanced.

7. The portable telephone set according to claim 6, which further comprises a data storing part for storing "on" control data of the illuminating means corresponding to a transmitter, a condition of the illuminating part being controlled with reference to said transmitter's data.

8. The portable telephone set according to claim 6, wherein the "on" pattern of the illuminating means is "on" time, "on"/"off" interval and "on" color change.

9. A portable telephone set comprising:
a main casing,
a movable casing,
a slidable locking means for slidably locking the main and movable casings to each other,
a lock release operator disposed on one side of the main or movable casing and operable for releasing the state of lock of the main and movable casings brought about by the slidable locking means, and
an illuminating means for illuminating the lock releasing means from the inner side, wherein,
the neighborhood of a part, in which the lock release operator of the main or movable casing is disposed, is at least partly made of a light-transmitting material, the illuminating means being "on"/"off" controlled at the time of operation of the lock release operator in dependence on whether the lock release operator is operable.

10. The portable telephone set according to claim 9, which further comprises a detecting means for detecting the advanced position of the main casing and the movable casing, a condition of the illuminating means being controlled according to whether the main casing and the movable casing have been retreated or advanced.

11. The portable telephone set according to claim 9, which further comprises a data storing part for storing "on" control data of the illuminating means corresponding to a transmitter, a condition of the illuminating part being controlled with reference to said transmitter's data.

12. The portable telephone set according to claim 9, wherein the lock release operator has a plurality of input operating functions, a condition of the illuminating means being controlled according to an input operating function brought about as a result of operation of the lock release operator.

13. The portable telephone set according to claim 9, wherein the "on" pattern of the illuminating means is "on" time, "on"/"off" interval and "on" color change.

14. The portable telephone set according to claim 2, wherein the main and movable casings are biased by a biasing means such that they are normally held pulled away from each other in long axis directions, and the portable telephone set further comprises a locking means for locking the two casings to each other in a retreated state, in which the two units are in an overlapped state, against the force of the biasing means.

15. A portable telephone set of slide type comprising a main casing, a movable casing, the two casings being slidably coupled and capable of being locked to each other, and a lock releasing means for releasing the lock, wherein:
the portable telephone set further comprises an illuminating means for illuminating the lock releasing means from the inner side, wherein the lock release operator has a plurality of input operating functions, a condition of the illuminating means being controlled according to an input operating function brought about as a result of operation of the lock release operator.

16. A portable telephone set comprising:
a main casing,
a movable casing,
a slidable locking means for slidably locking the main and movable casings to each other,
a lock release operator disposed on one side of the main or movable casing and operable for releasing the state of lock of the main and movable casings brought about by the slidable locking means, and
an illuminating means for illuminating the lock releasing means from the inner side,
wherein the neighborhood of a part, in which the lock release operator of the main or movable casing is disposed, is at least partly made of a light-transmitting material, the illuminating means being "on"/"off" controlled at a call arrival call time or a main reception time, and
wherein the lock release operator has a plurality of input operating functions, a condition of the illuminating means being controlled according to an input operating function brought about as a result of the lock release operator.

* * * * *